US012190862B2

(12) United States Patent
Rosenberg et al.

(10) Patent No.: US 12,190,862 B2
(45) Date of Patent: Jan. 7, 2025

(54) USING NON-PARALLEL VOICE CONVERSION FOR SPEECH CONVERSION MODELS

(71) Applicant: Google LLC, Mountain View, CA (US)

(72) Inventors: Andrew M. Rosenberg, Brooklyn, NY (US); Gary Wang, Brooklyn, NY (US); Bhuvana Ramabhadran, Mt. Kisco, NY (US); Fadi Biadsy, Mountain View, CA (US)

(73) Assignee: Google LLC, Mountain View, CA (US)

( * ) Notice: Subject to any disclaimer, the term of this patent is extended or adjusted under 35 U.S.C. 154(b) by 318 days.

(21) Appl. No.: 17/660,487

(22) Filed: Apr. 25, 2022

(65) Prior Publication Data

US 2023/0298565 A1 Sep. 21, 2023

Related U.S. Application Data

(60) Provisional application No. 63/269,700, filed on Mar. 21, 2022.

(51) Int. Cl.
*G10L 15/06* (2013.01)
*G10L 13/02* (2013.01)
(Continued)

(52) U.S. Cl.
CPC ............ *G10L 15/063* (2013.01); *G10L 13/02* (2013.01); *G10L 15/197* (2013.01); *G10L 15/22* (2013.01);
(Continued)

(58) Field of Classification Search
CPC ..... G10L 15/063; G10L 13/02; G10L 15/197; G10L 15/22; G10L 19/038; G10L 21/003;
(Continued)

(56) References Cited

U.S. PATENT DOCUMENTS

2022/0310056 A1* 9/2022 Ramabhadran ......... G10L 15/16
2023/0298565 A1* 9/2023 Rosenberg ............ G10L 21/003
704/235

FOREIGN PATENT DOCUMENTS

CN 112634920 A * 4/2021 ............. G10L 19/16
CN 113643687 A * 11/2021
CN 114023342 A * 2/2022

OTHER PUBLICATIONS

Wang Gary et al: "Improving Speech Recognition Using Consistent Predictions on Synthesized Speech", ICASSP 2020—2020 IEEE International Conference on Acoustics, Speech and Signal Processing (ICASSP), IEEE, May 4, 2020 (May 4, 2020), pp. 7029-7033.*

(Continued)

*Primary Examiner* — Edwin S Leland, III
(74) *Attorney, Agent, or Firm* — Honigman LLP; Brett A. Krueger; Grant Griffith

(57) ABSTRACT

A method includes receiving a set of training utterances each including a non-synthetic speech representation of a corresponding utterance, and for each training utterance, generating a corresponding synthetic speech representation by using a voice conversion model. The non-synthetic speech representation and the synthetic speech representation form a corresponding training utterance pair. At each of a plurality of output steps for each training utterance pair, the method also includes generating, for output by a speech recognition model, a first probability distribution over possible non-synthetic speech recognition hypotheses for the non-synthetic speech representation and a second probability distribution over possible synthetic speech recognition hypotheses for the synthetic speech representation. The method also includes determining a consistent loss term for the corresponding training utterance pair based on the first and second probability distributions and updating param- (Continued)

eters of the speech recognition model based on the consistent loss term.

22 Claims, 7 Drawing Sheets

(51) Int. Cl.
*G10L 15/197* (2013.01)
*G10L 15/22* (2006.01)
*G10L 19/038* (2013.01)
*G10L 21/003* (2013.01)
*G10L 15/16* (2006.01)
*G10L 19/00* (2013.01)

(52) U.S. Cl.
CPC .......... *G10L 19/038* (2013.01); *G10L 21/003* (2013.01); *G10L 2015/0635* (2013.01); *G10L 15/16* (2013.01); *G10L 2019/0001* (2013.01)

(58) Field of Classification Search
CPC ............. G10L 15/16; G10L 2015/0635; G10L 2019/0001
USPC ......................................................... 704/235
See application file for complete search history.

(56) References Cited

OTHER PUBLICATIONS

Shahnawazuddin S. et al: "Voice Conversion Based Data Augmentation to Improve Children's Speech Recognition in Limited Data Scenario", Interspeech 2020, Jan. 1, 2020 (Jan. 1, 2020), pp. 4382-4386.*

* cited by examiner

USING NON-PARALLEL VOICE CONVERSION FOR SPEECH CONVERSION MODELS

CROSS REFERENCE TO RELATED APPLICATIONS

This U.S. patent application claims priority under 35 U.S.C. § 119(e) to U.S. Provisional Application 63/269,700, filed on Mar. 21, 2022. The disclosure of this prior application is considered part of the disclosure of this application and is hereby incorporated by reference in its entirety.

TECHNICAL FIELD

This disclosure relates to using non-parallel voice conversion for speech recognition and joint recognition/conversion models.

BACKGROUND

Automatic speech recognition (ASR), the process of taking an audio input and transcribing it into text, has greatly been an important technology that is used in mobile devices and other devices. In general, automatic speech recognition attempts to provide accurate transcriptions of what a person has said by taking an audio input (e.g., speech utterance) and transcribing the audio input into text. However, one challenge in developing deep learning-based ASR models is that parameters of the ASR models tend to over fit the training data, thereby resulting in the ASR models having difficulties generalizing unseen data when the training data is not extensive enough. For instance, speech recognition can be limited by the speaker identities and speaker characteristics represented in its training data. As a result, training ASR models on larger training datasets improves the accuracy of the ASR model. Synthesized speech and/or data-augmented speech can be incorporated to increase the volume of training data used to train the ASR models.

SUMMARY

One aspect of the disclosure provides a computer-implemented method that when executed by data processing hardware causes the data processing hardware to perform operations that include receiving a set of training utterances each including a non-synthetic speech representation of a corresponding utterance, and for each training utterance, generating a corresponding voice conversion synthetic speech representation by using a voice conversion model to convert the non-synthetic speech representation into the corresponding voice conversion synthetic representation of the corresponding utterance. The non-synthetic speech representation and the synthetic speech representation form a corresponding training utterance pair. At each of a plurality of output steps for each training utterance pair in the set of training utterance pairs, the operations also include: generating, for output by a speech recognition model, a first probability distribution over possible non-synthetic speech recognition hypotheses for the corresponding non-synthetic speech representation of the corresponding utterance; generating, for output by the speech recognition model, a second probability distribution over possible synthetic speech recognition hypotheses for the corresponding synthetic speech representation of the corresponding utterance; and determining a consistent loss term for the corresponding training utterance pair based on the first probability distribution over possible non-synthetic speech recognition hypotheses and the second probability distribution over possible non-synthetic speech recognition hypotheses. The operations also include updating parameters of the speech recognition model based on the consistent loss term determined at each of the plurality of output steps for each training utterance pair in the set of training utterance pairs.

Implementations of the disclosure may include one or more of the following optional features. In some implementations, the operations also include, at each of the plurality of output steps for each training utterance pair in the set of training utterance pairs: generating a non-synthetic speech loss term based on the first probability distribution over possible non-synthetic speech recognition hypotheses for the corresponding non-synthetic speech representation of the corresponding utterance and a ground-truth transcription of the corresponding utterance, and generating a synthetic speech loss term based on the second probability distribution over possible synthetic speech recognition hypotheses for the corresponding synthetic speech representation of the corresponding utterance and the ground-truth transcription of the corresponding utterance. In these implementations, the parameters of the speech recognition model may be updated based on the consistent loss term determined at each of the plurality of output steps for each training utterance pair in the set of training utterance pairs independently of the non-synthetic and synthetic speech loss terms generated at each of the plurality of output steps for each training utterance pair in the set of training utterance pairs.

In some examples, the non-synthetic speech representation of the corresponding utterance includes speech spoken by a source speaker and conveys an accent/locale associated with the source speaker, and the voice conversion synthetic representation of the corresponding utterance includes synthesized speech representing the corresponding utterance that conveys an accent/local associated with a target speaker. Here, the accent/local associated with the source speaker may be different than the accent/local associated with the target speaker. Optionally, the voice conversion synthetic speech representation may convey the same linguistic content as the non-synthetic speech representation of the corresponding utterance. The voice conversion model may include a non-parallel voice conversion model.

In some implementations, the voice conversion model includes a content encoder, a vector quantization-variational autoencoder (VQ-VAE) layer, and a decoder. The content encoder is configured to receive, as input, input speech, and generate, as output, an initial latent representation. The VQ-VAE layer is configured to receive, as input, the initial latent representation and generate, as output, a latent representation of linguistic content extracted from the input speech that discards speaking style variations in the input speech. The decoder is conditioned on a speaker embedding and configured to generate output speech based on the latent representation of linguistic content. The content encoder may include a pretrained automatic speech recognition (ASR) encoder previously trained on ASR loss for a speech recognition task. Here, the parameters of the pretrained ASR encoder remained fix while training the VQ-VAE layer and the decoder of the voice conversion model. Additionally or alternatively, the VQ-VAE layer may be trained using a VQ loss based on the latent representation of linguistic content generated for each timestep, wherein the VQ loss encourages the VQ-VAE layer to minimize a distance between an output and a nearest codebook. In some implementations, the decoder is configured to receive, as input, the latent representation of linguistic content for the input speech and the speaker embedding and generate, as output, the output speech comprising a reconstruction of the input speech.

Another aspect of the disclosure provides a system that includes data processing hardware and memory hardware in communication with the data processing hardware and storing instructions that when executed on the data processing hardware causes the data processing hardware to perform operations that include receiving a set of training utterances each including a non-synthetic speech representation of a corresponding utterance, and for each training utterance, generating a corresponding voice conversion synthetic speech representation by using a voice conversion model to convert the non-synthetic speech representation into the corresponding voice conversion synthetic representation of the corresponding utterance. The non-synthetic speech representation and the synthetic speech representation form a corresponding training utterance pair. At each of a plurality of output steps for each training utterance pair in the set of training utterance pairs, the operations also include: generating, for output by a speech recognition model, a first probability distribution over possible non-synthetic speech recognition hypotheses for the corresponding non-synthetic speech representation of the corresponding utterance; generating, for output by the speech recognition model, a second probability distribution over possible synthetic speech recognition hypotheses for the corresponding synthetic speech representation of the corresponding utterance; and determining a consistent loss term for the corresponding training utterance pair based on the first probability distribution over possible non-synthetic speech recognition hypotheses and the second probability distribution over possible non-synthetic speech recognition hypotheses. The operations also include updating parameters of the speech recognition model based on the consistent loss term determined at each of the plurality of output steps for each training utterance pair in the set of training utterance pairs.

This aspect may include one or more of the following optional features. In some implementations, the operations also include, at each of the plurality of output steps for each training utterance pair in the set of training utterance pairs: generating a non-synthetic speech loss term based on the first probability distribution over possible non-synthetic speech recognition hypotheses for the corresponding non-synthetic speech representation of the corresponding utterance and a ground-truth transcription of the corresponding utterance; and generating a synthetic speech loss term based on the second probability distribution over possible synthetic speech recognition hypotheses for the corresponding synthetic speech representation of the corresponding utterance and the ground-truth transcription of the corresponding utterance. In these implementations, the parameters of the speech recognition model may be updated based on the consistent loss term determined at each of the plurality of output steps for each training utterance pair in the set of training utterance pairs independently of the non-synthetic and synthetic speech loss terms generated at each of the plurality of output steps for each training utterance pair in the set of training utterance pairs.

In some examples, the non-synthetic speech representation of the corresponding utterance includes speech spoken by a source speaker and conveys an accent/locale associated with the source speaker, and the voice conversion synthetic representation of the corresponding utterance includes synthesized speech representing the corresponding utterance that conveys an accent/local associated with a target speaker. Here, the accent/local associated with the source speaker may be different than the accent/local associated with the target speaker. Optionally, the voice conversion synthetic speech representation may convey the same linguistic content as the non-synthetic speech representation of the corresponding utterance. The voice conversion model may include a non-parallel voice conversion model.

In some implementations, the voice conversion model includes a content encoder, a vector quantization-variational autoencoder (VQ-VAE) layer, and a decoder. The content encoder is configured to receive, as input, input speech, and generate, as output, an initial latent representation. The VQ-VAE layer is configured to receive, as input, the initial latent representation and generate, as output, a latent representation of linguistic content extracted from the input speech that discards speaking style variations in the input speech. The decoder is conditioned on a speaker embedding and configured to generate output speech based on the latent representation of linguistic content. The content encoder may include a pretrained automatic speech recognition (ASR) encoder previously trained on ASR loss for a speech recognition task. Here, the parameters of the pretrained ASR encoder remained fix while training the VQ-VAE layer and the decoder of the voice conversion model. Additionally or alternatively, the VQ-VAE layer may be trained using a VQ loss based on the latent representation of linguistic content generated for each timestep, wherein the VQ loss encourages the VQ-VAE layer to minimize a distance between an output and a nearest codebook. In some implementations, the decoder is configured to receive, as input, the latent representation of linguistic content for the input speech and the speaker embedding and generate, as output, the output speech comprising a reconstruction of the input speech.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
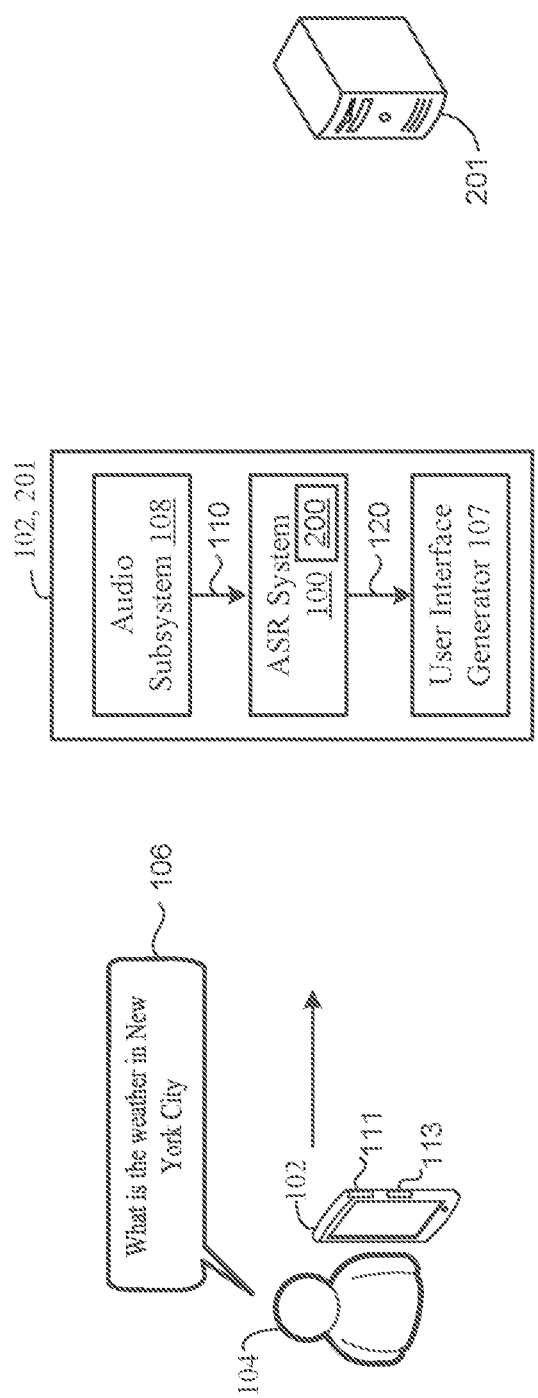
FIG. 1 is a schematic view of an example speech recognition system.

Automated speech recognition has made tremendous strides with the introduction of sequence to sequence (Seq2Seq) models that map from audio to character sequences. At the same time, text-to-speech (TTS) or speech syntheses systems have successfully applied Seq2Seq models to obtain state of the art natural, realistic sounding synthesized speech that can be indistinguishable to the human ear from human speech.

One challenge in developing deep learning-based ASR models is that parameters of the ASR models tend to over fit the training data, thereby resulting in the ASR models having difficulties generalizing unseen data when the training data is not extensive enough. As a result, training ASR models on larger training datasets improves the accuracy of the ASR model. For instance, the use of machine learning or other statistical methods can train ASR models on training data sets that include upwards of 10,000 hours of transcribed speech. Yet, performance of ASR models suffers when a domain associated with the training data is distinct from a domain at which the ASR model will be deployed during inference. For example, training an ASR model on transcribed speech in a domain associated with video meetings would lose would be less effective in recognizing speech related to voice search queries, and vice versa. ASR models are further limited by speaker identities and speaker characteristics represented in the training data. For instance, utterances generally convey speaker traits such as pitch, timbre, and prosody/style of a speaker that spoke the training utterance.

Implementations herein are directed toward using voice conversion for manipulating speaker traits (e.g., pitch, timbre, prosody, style) in a spoken training utterance to expose an ASR model or automatic voice conversion (e.g., speech to speech) model to a more diverse range of speakers, and thus improve robustness of the resulting model. Implementations herein additional include using voice conversion augmentation in order to change a perceived accent of an input training utterance in order to improve speech recognition performance on accented speech or speech from other dialects/domains that are underrepresented/scarce in the available transcribed training data (i.e., spoken utterance paired with a transcription).

Generally, the use of synthesized speech has shown to impact ASR training differently than human speech, despite instances of state of the art synthesized speech being indistinguishable from human speech. This gap between synthesized speech and human speech is attributed to mismatches in the synthesized speech data from the human speech data that arise from the difficult one-to-many mapping problem that both voice conversion and TTS systems are trying to solve. Namely, while the aggregate quality of available synthesized speech is very high, the synthesized speech exhibits much less variation than human speech, as well as minimal speech disfluencies. As a result, training ASR models exclusively on synthesized speech data presents a difficulty for generalizing real speech utterances during inference.

Implementations herein are further directed toward training a speech conversion model (i.e., ASR model and/or speech to speech (S2S) model) on real/human speech and synthesized speech representations of a same training utterance and introducing a consistent loss term to promote consistent predictions (e.g., speech recognition hypothesis) on both the real/human and synthesized representations of the same training utterance. In short, the consistent loss term between human and synthesized representations of a same utterance provides an unsupervised training aspect by encouraging the speech conversion model to behave consistently on training utterances of human speech and synthesized speech.

FIG. 1 illustrates an automated speech recognition (ASR) system 100 implementing an ASR model 200 that resides on a user device 102 of a user 104 and/or on a remote computing device 201 (e.g., one or more servers of a distributed system executing in a cloud-computing environment) in communication with the user device 102. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device, and is equipped with data processing hardware 111 and memory hardware 113.

The user device 102 includes an audio subsystem 108 configured to receive an utterance 106 spoken by the user 104 (e.g., the user device 102 may include one or more microphones for recording the spoken utterance 106) and convert the utterance 106 into a corresponding digital format associated with input acoustic frames 110 capable of being processed by the ASR system 100. In the example shown, the user speaks a respective utterance 106 in a natural language of English for the phrase "What is the weather in New York City?" and the audio subsystem 108 converts the utterance 106 into corresponding acoustic frames 110 for input to the ASR system 100. Thereafter, the ASR model 200 receives, as input, the acoustic frames 110 corresponding to the utterance 106, and generates/predicts, as output, a corresponding transcription 120 (e.g., recognition result/hypothesis) of the utterance 106. In the example shown, the user device 102 and/or the remote computing device 201 also executes a user interface generator 107 configured to present a representation of the transcription 120 of the utterance 106 to the user 104 of the user device 102. In some configurations, the transcription 120 output from the ASR system 100 is processed, e.g., by a natural language understanding (NLU) module executing on the user device 102 or the remote computing device 201, to execute a user command. Additionally or alternatively, a text-to-speech system (e.g., executing on any combination of the user device 102 or the remote computing device 201) may convert the transcription into synthesized speech for audible output by another device. For instance, the original utterance 106 may correspond to a message the user 104 is sending to a friend in which the transcription 120 is converted to synthesized speech for audible output to the friend to listen to the message conveyed in the original utterance 106.

Figure 2A:
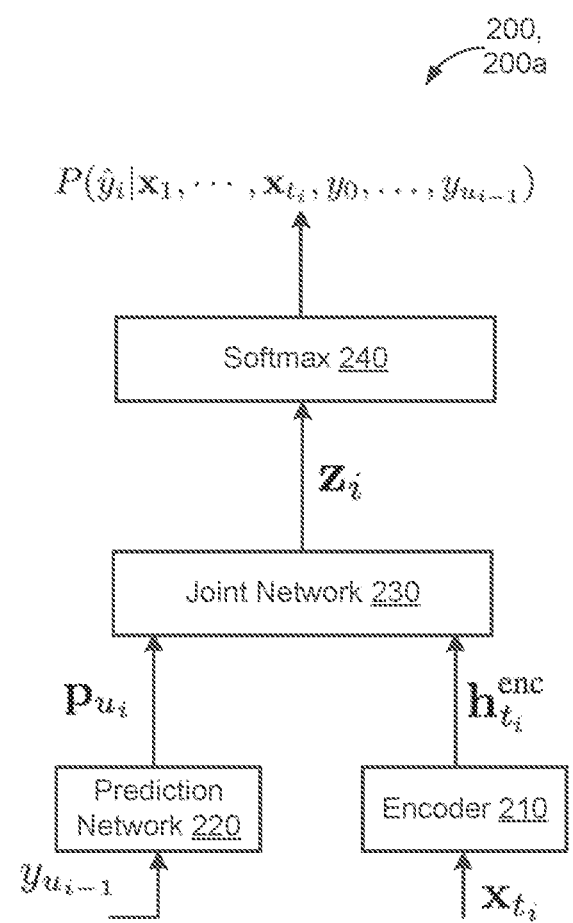
FIG. 2A is a schematic view of a Recurrent Neural Network-Transducer (RNN-T) model architecture.
Figure 2B:
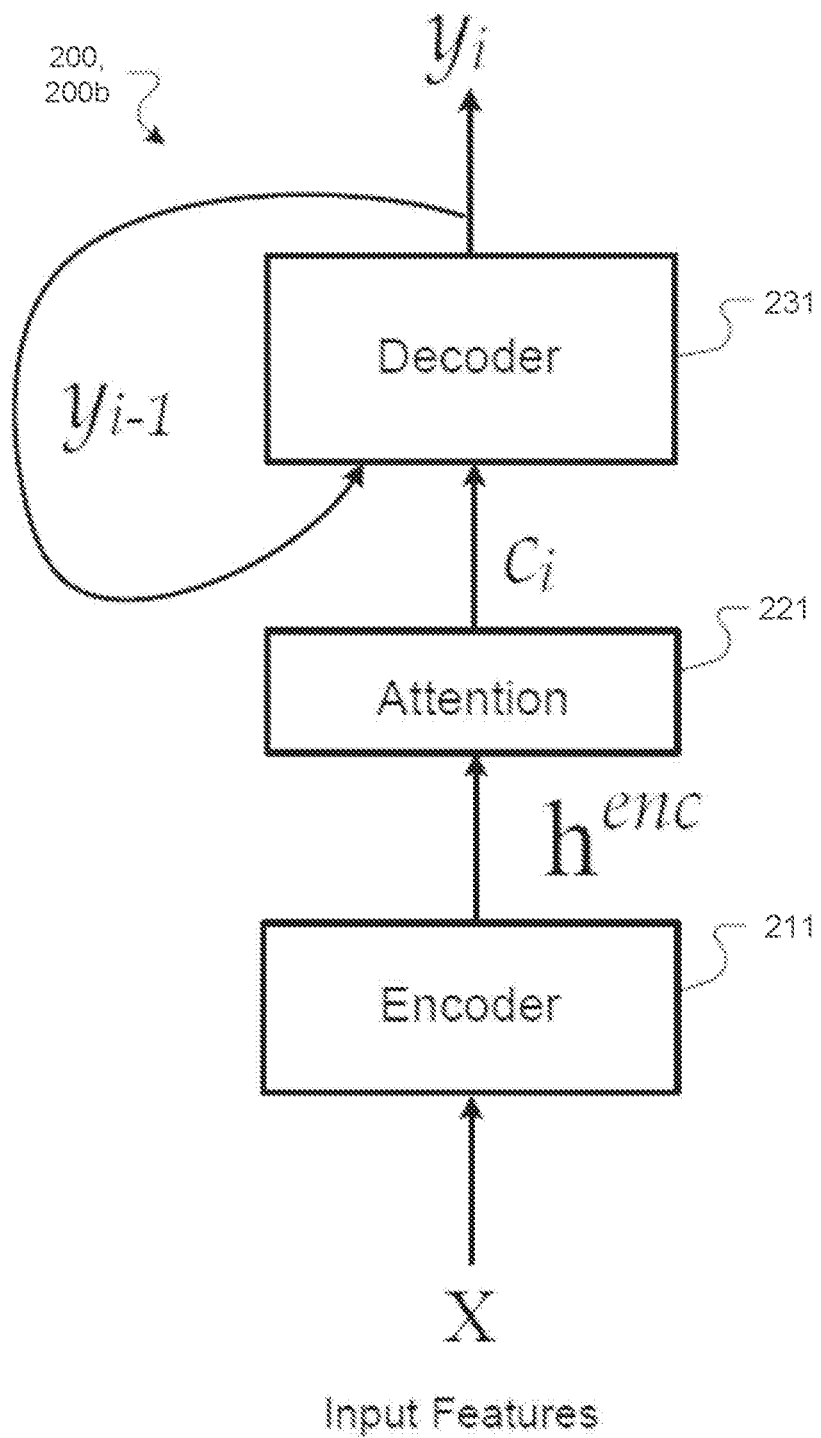
FIG. 2B is a schematic view of an Attention-Based Encoder-Decoder (AED) model architecture.

With reference to FIGS. 2A and 2B, the ASR model 200 may include an end-to-end (E2E) sequence-to-sequence model, such as a frame alignment-based transducer model 200a (FIG. 2A) or an attention-based encoder-decoder (AED) model 200b (FIG. 2B). The ASR model 200 may provide E2E speech recognition by integrating acoustic, pronunciation, and language models into a single neural network, and does not require a lexicon or a separate text normalization component. Various structures and optimization mechanisms can provide increased accuracy and reduced model training time.

Referring to FIG. 2A, an example frame alignment-based transducer model 200a includes a Recurrent Neural Network-Transducer (RNN-T) model architecture which adheres to latency constrains associated with interactive applications. The RNN-T model 200a provides a small computational footprint and utilizes less memory requirements than conventional ASR architectures, making the RNN-T model architecture suitable for performing speech recognition entirely on the user device 102 (e.g., no communication with a remote server is required). The RNN-T model 200a includes an encoder network 210, a prediction network 220, and a joint network 230. The encoder network 210, which is roughly analogous to an acoustic model (AM) in a traditional ASR system, includes a recurrent network of stacked Long Short-Term Memory (LSTM) layers. For instance, the encoder reads a sequence of d-dimensional feature vectors (e.g., acoustic frames 110 (FIG. 1)) $x=(x_1, x_2, \ldots, x_T)$, where $x_t \in \mathbb{R}^d$, and produces at each time step a higher-order feature representation. This higher-order feature representation is denoted as $h_1^{enc}, \ldots, h_T^{enc}$.

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $p_{u_i}$. Finally, with the RNN-T model architecture, the representations produced by the encoder and prediction networks 210, 220 are combined by the joint network 230. The joint network then predicts $P(y_i|x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the RNN-T model 200a at the corresponding output step. In this manner, the RNN-T model 200a does not make a conditional independence assumption, rather the prediction of each symbol is conditioned not only on the acoustics but also on the sequence of labels output so far. The RNN-T model 200a does assume an output symbol is independent of future acoustic frames 110, which allows the RNN-T model to be employed in a streaming fashion.

Figure 3:
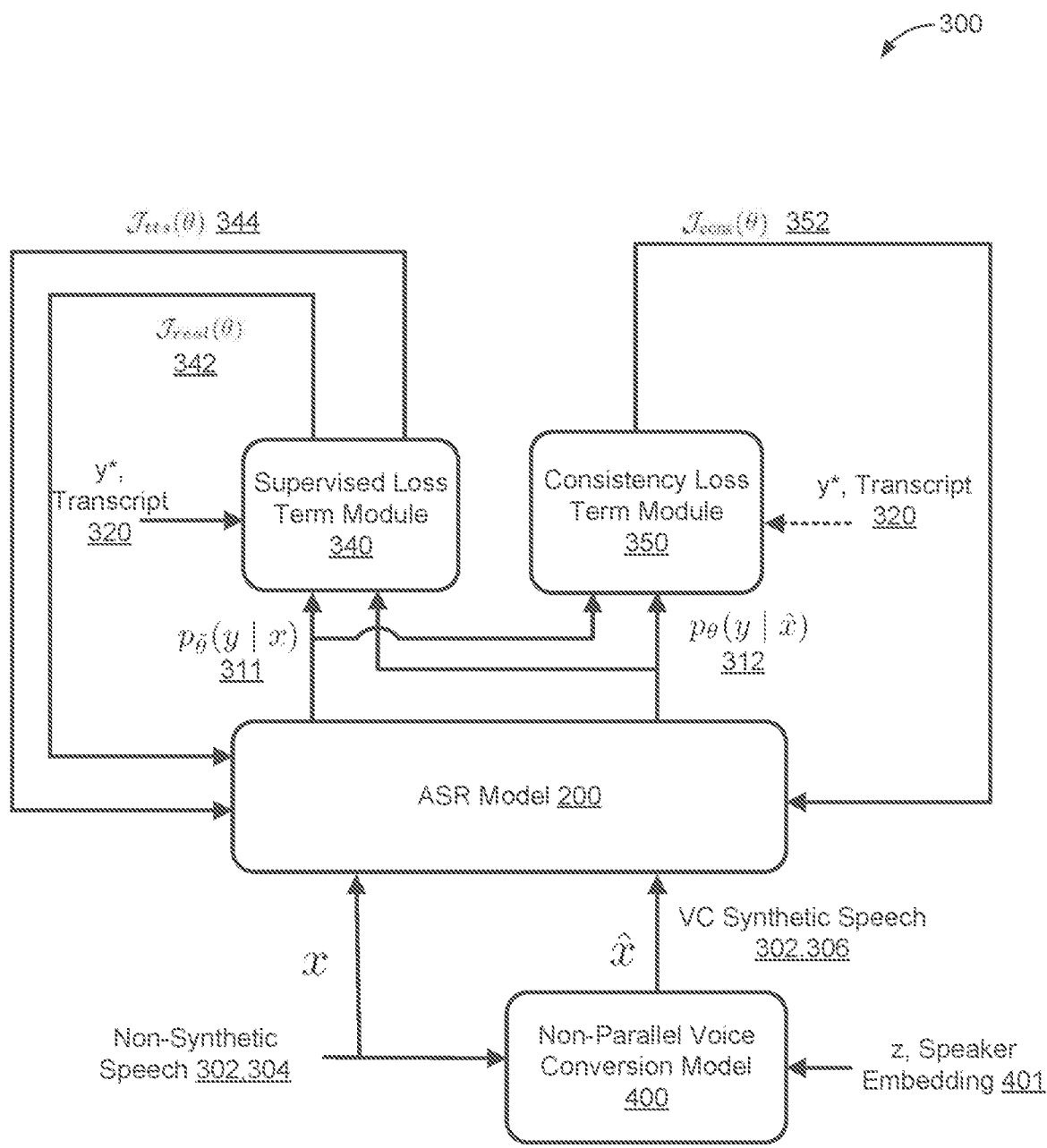
FIG. 3 is a schematic view of an example training process for promoting a speech recognition model of to learn consistent predictions on both non-synthetic speech and voice conversion synthetic speech.

In some examples, the encoder network 210 of the RNN-T model 200a is made up of eight 2,048-dimensional LSTM layers, each followed by a 640-dimensional projection layer. The prediction network 220 may have two 2,048-dimensional LSTM layers, each of which is also followed by 640-dimensional projection layer Finally, the joint network 230 may also have 640 hidden units. In lieu of LSTM layers, the encoder and/or prediction networks 210, 220 may instead employ multi-headed self-attention layers, such as Conformer layers, Transformer layers, or lightweight convolution (LConv) layers. The prediction network 220 may instead employ an embedding look-up table instead of a network of LSTM or multi-headed self-attention layers. The softmax layer 240 may be composed of a unified word piece or grapheme set that is generated using all unique word pieces or graphemes in a plurality of training data sets 301 (FIG. 3).

Referring to FIG. 2B, an example AED model 200b associated with a Listen, Attend and Spell (LAS) model architecture that provides a single neural network including a listener encoder module 211 which is analogous to a conventional acoustic model, an attender module 221 that acts as an alignment model, and a decoder 231 that is analogous to the language model in a conventional system. Specifically, the listener encoder module 211 takes the input features (e.g., acoustic frames 110 (FIG. 1)), x, and maps them to a higher-level feature representation, $h^{enc}$. This process of generating an encoded feature representation, $h^{enc}$, can be done for each of the multiple input frames, representing different input time steps. These timesteps are denoted with a subscript u below. Thus, for a set of frames $\{f_1, f_2, f_3, \ldots f_u\}$ there can be a corresponding set of encoded outputs $\{h_1, h_2, h_3, \ldots h_u\}$.

The output of the listener encoder module 211 is passed to the attender module 221, which determines which encoder features in $h^{enc}$ should be attended to in order to predict the next output symbol, $y_i$, similar to a dynamic time warping (DTW) alignment module. In some examples, the attender module 221 is referred to herein as attender neural network or attender 221. The attender 221 can generate a context output $c_i$ for each of multiple output steps i. For each context output vector $c_i$, the attender 221 can compute attention based on the encodings for one or more input steps u, e.g., the encoding for the current input step as well as encodings for previous input steps. For example, the attender 221 can generate an attention context output $c_i$ over the set of all the encoder outputs of the utterance, e.g., the entire set $\{h_1, h_2, h_3, \ldots h_u\}$. The attention context vector can be a vector representing a weighted summary of the current and previous encodings for frames (e.g., portions) of the utterance being recognized.

Finally, the output of the attender 221 is passed to the decoder 231, which takes the attention context (e.g., a context vector or attention distribution), $c_i$, output by the attender 221, as well as an embedding of the previous prediction, $y_{i-1}$, in order to produce a decoder output. The decoder output can be a probability distribution, $P(y_i|y_{i-1}, \ldots, y_0, x)$, over the current sub-word unit, $y_i$, given the previous units, $\{y_{i-1} \ldots y_0\}$, and input, x. Accordingly, the decoder 231 generates, at each output step, a probability distribution over possible speech recognition hypotheses. As with the RNN-T model 200a discussed above with reference to FIG. 2A, the "possible speech recognition hypotheses" correspond to a set of output symbols each representing a symbol/character in a specified natural language.

Although not illustrated, the ASR model 200 may include a softmax layer that receives output of the decoder 231. In some implementations, the softmax layer is separate from the decoder 231 and processes the output, $y_i$, from the decoder 231, and the output of the softmax layer is then used in a beam search process to select orthographic elements. In some implementations, the softmax layer is integrated with the decoder 231, so that the output $y_i$ of the decoder 231 represents the output of the softmax layer.

The decoder 231 and/or an associated softmax layer may be trained to output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels are not so limited. For example, the set of output labels can include wordpieces and/or entire words, in addition to or instead of graphemes. The output distribution of the decoder 231 and/or the softmax layer can include a posterior probability value for each of the different output labels. Thus, if there are 100 different output labels representing different graphemes or other symbols, the output $y_i$ of the decoder or the output of a softmax layer that receives and processes the output $y_i$ can include 100 different probability values, one for each output label. The probability distribution can then be used to select and assign scores to candidate orthographic elements (e.g., graphemes, wordpieces, and/or words) in a beam search process for determining the transcription.

Referring to FIG. 3, an example training process 300 for promoting the ASR model 200 to learn consistent predictions on both non-synthetic speech (e.g., real/human speech) and voice conversion (VC) synthetic speech (e.g., synthesized speech) includes generating a consistent loss term ($\mathcal{J}_{cons}(\theta)$) 352 between training utterance pairs 302 (also referred to as "training audio pairs") of non-synthetic and VC synthetic speech representations 304, 306 of a same training utterance. In short, the consistent loss term between the non-synthetic and VC synthetic speech representations of the same training utterance provides an unsupervised training aspect by encouraging the ASR model 200 to behave consistently regardless of whether the training utterance belongs to non-synthetic speech or VC synthetic speech and independent of supervised loss terms between a ground-truth transcription 320 and each of non-synthetic speech recognition hypotheses output by the ASR model 200; and VC synthetic speech recognition hypothesis output by the ASR model 200.

The training process 300 may execute on the remote computing device 201 of FIG. 1. For instance, the remote computing device 201 includes data processing hardware 610 (FIG. 6) and memory hardware 620 (FIG. 6) in communication with the data processing hardware and storing instructions that when executed on the data processing hardware 610 cause the data processing hardware 610 to perform operations of the training process 300. In the example shown, training process 300 receives a set of training utterance pairs 302 and each training utterance pair 302 includes a non-synthetic speech representation 304 (e.g., human/real speech) of a corresponding utterance and a VC synthetic speech representation 306 of the same corresponding utterance. Each training utterance pair 302 is also associated with a same ground-truth transcription 320 of the corresponding utterance. In some implementations, the non-synthetic speech representation 304 is initially paired with the ground-truth transcription 320. For instance, each non-synthetic speech representation 304 may be hand-transcribed by a human listener. In these implementations, a non-parallel voice conversion (VC) model 400 may convert the non-synthetic speech representation 304 of the corresponding utterance directly into the VC synthetic speech representation 306 to provide the corresponding training utterance pair 302. Here, the VC synthetic speech representation 306 is associated with synthesized speech generated by the VC model 400 by converting audio associated with the non-synthetic speech representation 304 into synthesized audio without the need to perform any intermediary speech recognition. The VC model 400 may apply a speaker embedding 401, z, when converting the non-synthetic speech representation 304 to obtain synthesized speech with a specific accent and/or speaking style and/or prosody associated with the speaker embedding 401. Thus, the VC model 400 may convert the non-synthetic speech representation 304 into an arbitrary number of new VC synthetic speech representations 306 based on how many different unique speaker embeddings 401 are available during inference. Here, the non-synthetic speech representation (x) 304 is associated with a source for supervised data augmentation in which the VC model 400 generates one or more new VC synthetic speech representations ($\hat{x}$) 306 that each have an expectation of being consistent with the non-synthetic speech representation (x) 304 associated with the ground-truth transcription (y*) 320.

In some examples, the training process 300 applies data augmentation to at least one of the non-synthetic speech representation 304 or the VC synthetic speech utterance representation 306 of at least one of the training utterance pairs 302. The data augmentation may include, without limitation, adding noise, manipulating timing (e.g., stretching), or adding reverberation to the corresponding speech representation.

The ASR model 200 receives, as input, the non-synthetic speech representation (x) 304 for the corresponding utterance as a sequence of features/vectors (e.g., acoustic frames 110 of FIG. 1) and generates, as output, for each of a plurality output steps, a first probability distribution 311 over possible non-synthetic speech recognition hypotheses (y) for the corresponding non-synthetic speech representation (x) 304 of the corresponding utterance. For simplicity, the term "non-synthetic speech recognition result 311" may be used to refer to the first probability distribution 311 over possible non-synthetic speech recognition hypotheses (y) for the corresponding non-synthetic speech representation (x) 304. The ASR model 200 also receives, as input, the VC synthetic speech representation (z) 306 for the corresponding utterance as a sequence of features/vectors (e.g., acoustic frames 110 of FIG. 1) and generates, as output, for each of the plurality of output steps, a second probability distribution 312 over possible synthetic speech recognition hypotheses (y) for the corresponding VC synthetic speech representation ($\hat{x}$) 306 of the corresponding utterance. For simplicity, the term "synthetic speech recognition result 312" may be used to interchangeably refer to the second probability distribution 312 over possible synthetic speech recognition hypotheses (y) for the corresponding synthetic speech representation ($\hat{x}$) 306.

As with training a conventional end-to-end sequence-to-sequence ASR model, the training process 300 generates, for output by the ASR model 200 at each of the plurality of output steps, a first supervised loss term that includes a non-synthetic speech loss term ($\mathcal{J}_{real}(\theta)$) 342 based on the ground-truth transcription 320 and the non-synthetic speech recognition result 311 ($y$) for the corresponding non-synthetic speech representation (x) 304 of the corresponding utterance. In the example shown, the training process 300 executes a supervised loss term module 340 configured to receive the ground-truth transcription 320 and the first probability distribution 311 and output the non-synthetic speech loss term ($\mathcal{J}_{real}(\theta)$) 342. The first supervised loss term including the non-synthetic speech loss term ($\mathcal{J}_{real}(\theta)$) 342 may be calculated by the following equation.

$$\mathcal{J}_{real}(\theta) = \mathbb{E}_{x,y^* \in L}[p_\theta(y^*|x)] \quad (1)$$

Moreover, the training process 300 generates, at each of the plurality of output steps, a second supervised loss term for that includes a VC synthetic speech loss term ($\mathcal{J}_{tts}(\theta)$) 344 based on the ground-truth transcription 320 and the second probability distribution 312 over possible VC synthetic speech recognition hypotheses (y) for the corresponding VC synthetic speech representation ($\hat{x}$) 306 of the corresponding utterance. In the example shown, the training process 300 executes the supervised loss term module 340 configured to receive the ground-truth transcription 320 and the second probability distribution 312 and output the VC synthetic speech loss term ($\mathcal{J}_{tts}(\theta)$) 344. The second supervised loss term including the VC synthetic speech loss term ($\mathcal{J}_{tts}(\theta)$) 344 may be calculated by the following equation.

$$\mathcal{J}_{tts}(\theta) = \mathbb{E}_{x,y^* \in L}[p_\theta(y^*|\hat{x} \sim q(\hat{x}|y^*,z))] \quad (2)$$

where y*, z denotes the VC synthetic speech representation ($\hat{x}$) 306 generated by converting the non-synthetic speech representation 304 via the VC model 400 using the speaker embedding (z).

The supervised loss term module 340 may provide the non-synthetic speech loss term ($\mathcal{J}_{real}(\theta)$) 342 and the VC synthetic speech loss term ($\mathcal{J}_{tts}(\theta)$) 344 back to the ASR model 200. For instance, the training process 300 may train the ASR model 200 using a stochastic optimization algorithm, such as stochastic gradient decent, to train the ASR model 200 through backpropagation. Here, the stochastic optimization algorithm uses the loss terms 342, 344 to define respective loss functions (e.g., cross-entropy loss functions) based on a difference between actual outputs (e.g., non-synthetic speech recognition and synthetic speech recognition results 311, 312) of the neural network and desired outputs (e.g., the ground-truth transcription 320 of the corresponding utterance). For instance, the loss function is computed for a batch of training examples, and then differentiated with respect to each weight in the ASR model 200. In batch training, the non-synthetic speech loss term ($\mathcal{J}_{real}(\theta)$) 342 may correspond to an average loss obtained for a respective batch of non-synthetic speech representations 304 and the VC synthetic speech loss term ($\mathcal{J}_{tts}(\theta)$) 344 may correspond to an average loss obtained for a respective batch of synthetic speech representations 306. Further, the ASR model 200 may be trained on corresponding batches of non-synthetic and VC synthetic speech representations 304, 306 in parallel such that the supervised loss term module 340 outputs corresponding non-synthetic and VC synthetic speech loss terms 342, 344 in parallel.

In the example shown, the training process 300 further determines, at each of the plurality of output steps for each training utterance pair 302, a consistent loss term ($\mathcal{J}_{cons}(\theta)$) 352 for the corresponding training utterance pair 302 based on the first probability distribution 311 over possible non-synthetic speech recognition hypotheses and the second probability distribution 312 over possible VC synthetic speech recognition hypotheses. For instance, the training process 300 may employ a consistency loss term module 350 configured to receive, at each output step, the corresponding non-synthetic speech and VC synthetic speech recognition results 311, 312 output by the ASR model 200, and determine the consistency loss term 352 for the corresponding training utterance pair 302 at the output step.

In some examples, the training process 300 determines the consistent loss term 352 based on a Kullback-Leibler divergence ($D_{KL}$) between the first probability distribution 311 over possible non-synthetic speech recognition hypotheses and the second probability distribution 312 over possible synthetic speech recognition hypotheses. The consistent loss term 352 based on $D_{KL}$ may be expressed by the following equation.

$$\mathcal{J}(\theta) = \mathbb{E}_{x \in U} \mathbb{E}_{x \sim q(\hat{x}|x)} \mathcal{D}_{KL}(p_{\bar{\theta}}(y|x) \| p_\theta(y|\hat{x})) \quad (3)$$

Here, the consistent loss term 352 determined for the training utterance pair 302 at each output step provides an "unsupervised" loss term that is independent of the accuracy of the ASR model (e.g., independent of the supervised loss terms 342, 344), and thus, may be employed to update parameters of the ASR model 200 for promoting consistency between non-synthetic and VC synthetic speech representations of same utterances. In batch training, the consistent loss term 352 may correspond to an average loss term obtained for the batch. In other words, the consistent loss term 352 permits the ASR model 200 to learn to behave the same, e.g., make consistent predictions on both non-synthetic speech (e.g., real/human speech) and VC synthetic speech (e.g., synthesized speech generated through voice conversion) of a same training utterance, regardless of whether the training utterance belongs to non-synthetic speech or VC synthetic speech. In the example shown, the training process 300 is configured to output corresponding non-synthetic and VC synthetic speech loss terms 342, 344 from the supervised loss term module 340 and output the consistent loss term 352 from the consistency loss term module 350 in parallel.

Advantageously, the ASR model 200 can then be further trained on large data sets of VC synthetic speech without having to rely on non-synthetic speech training examples, or at least reduce the number of non-synthetic speech training examples relative to the number of VC synthetic speech representations, to produce accurate speech recognition results for human utterances during inference. Accordingly, the ASR model 200 is capable of rapidly recognizing a new accent/dialect and/or recognizing different types of speech (e.g., atypical speech) without having to rely on transcribed, non-synthetic speech having desired speaking traits since VC synthetic speech can be generated from on the fly for training the ASR model 200. In one example use case, accuracy of the ASR model 200 can be drastically improved for recognizing speech in natural languages where transcribed non-synthetic speech is difficult to obtain by increasing the number of speech training examples from voice conversion synthetic speech converted by a parallel voice conversion model from source non-synthetic speech and different speaker embeddings.

Figure 4:
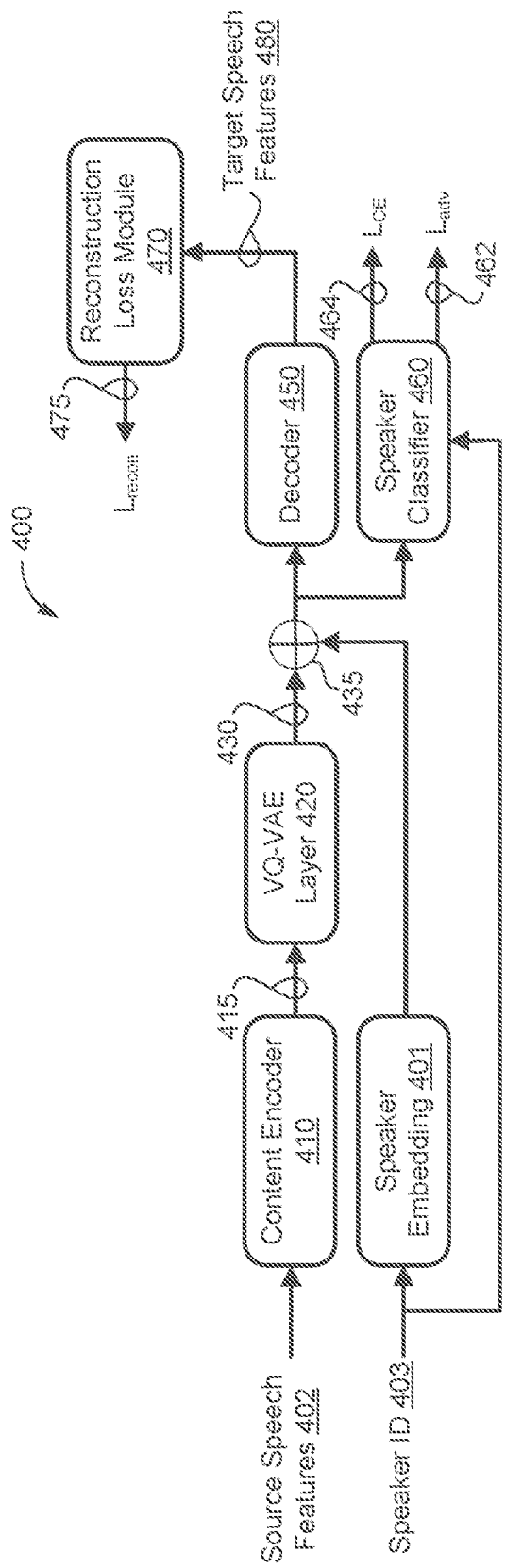
FIG. 4 is a schematic view of an example non-parallel voice conversion model.

FIG. 4 is an example of a non-parallel voice conversion (VC) model 400. The term "non-parallel" refers to the voice conversion model 400 not requiring multiple speakers saying a same utterance for use in training. The VC model 400 includes a content encoder 410 configured to encode source speech features 402, followed by a vector-quantized variational autoencoder (VQ-VAE) layer 420 configured to bottleneck information contained in the content encoder 410 to encourage removal/disentangling of style content from the source speech features 402, and a decoder 450 conditioned by speaker identifiers (IDs) 403 to reconstruct the input speech features 410 as target speech features 480 of synthetic/synthesized speech.

The VQ-VAE layer 420 may include a codebook size of 128 and have two groups. The decoder 450 may include a simple speaker embedding 401 lookup based on speaker ID 403, wherein each speaker embedding 401 is tiled across time and concatenated with a latent representation of linguistic content 430 output from the VQ-VAE layer 420 to form a concatenated input 440 that is fed to the decoder 450. In some examples, the decoder 450 includes a network of bi-directional long short-term memory (LSTM) layers followed by a stack of residual convolutional layers having 4× time upsampling.

The VC model 400 may be applied in data augmentation applications where a latent representation of linguistic content 430 is extracted from a non-synthetic source speech sample 402 conveying a first locale/accent to produce new speech features 480 from the decoder 450 that convey different augmentations of synthesized speech for the same linguistic content 430 but conveying different locales/accents. Here, each new speech features 480 output from the decoder 450 may include a different local/accent than the first local/accent locale conveyed by the source speech sample 402 that is based on a respective speaker embedding 401 representing speaker characteristics of a respective target speaker. An output including the ASR model 200 (or optionally a speaker identification model) may receive the output speech features 480 for training the ASR model 200 (or optionally the speaker identification model). Additionally, the VC model may modify the speech of source speaker by transferring channel/noise into the resulting target speech features 480 for acoustic diversity in training the ASR model 200.

The content encoder 410 and the VQ-VAE layer 420 are configured to learn discrete per-timestep (e.g., per frame) latent representations capturing the linguistic content 430 from the source speech samples 402. Specifically, the content encoder 410 may receive the source speech samples 402 to generate an initial latent representation 415 from the speech samples 402 and the VQ-VAE layer 420 applies an information bottleneck with straight-through gradients on the initial latent representation 415 to capture necessary localized information, such as phoneme or subword-like latent representations, and discard speaking style variations. Thus, the VQ-VAE layer 420 may output a sequence of latent variables representing the linguistic content 130 from the input speech samples 402. Thereafter, a concatenator 435 may concatenate the speaker embedding 401 for the target speaker (represented by the speaker ID 403) and the latent representation of linguistic content 430 into the concatenated input 440 fed to the decoder 450 for decoding into the targets speech features 480 that convey the same linguistic content but with speaker characteristics (e.g., accent/locale, speaking style, etc.) associated with the target speaker.

In some implementations, the content encoder 410 used by the VC model 400 includes a trained ASR encoder. Notably, using the trained ASR encoder as the content encoder 410 simples a training process for training the VC model 400, provides robustness to the VC model 400, and helps facilitate the targeting of input speech samples in unseen languages and domains. As used herein, the trained ASR encoder refers to an ASR encoder implemented by an ASR model for performing speech recognition, thereby the ASR encoder is trained on the ASR objective function to only include lexical content of the training data such that speaker identity is ignored by the trained ASR encoder.

Moreover, implementing the pretrained ASR encoder 410 as the content encoder 410 assists in controlling accent conversion such that the target speech features 480 convey a locale/accent associated with the target speaker ID 403 without retaining any local/accent information from the source speech features 402. An inventory of speaker IDs 403 is associated with a set of speakers that was available during training of the VC model performed on datasets. Evaluations have found that training the content encoder from scratch (random initialization of weights) using only VC training data, the local/accent information of the source speech features 402 will be reflected in the target speech features 480. In other words, the trained ASR encoder is more reliable for removing accent information from the resulting encoded sequence (i.e., initial latent representation) 415, thereby allowing the speaker ID 403 to encode more accent information to provide greater accent control of the VC synthetic target speech features 480 output from the VC model. Accent conversion can then be used as a data augmentation technique for training the ASR model 200 to be more robust to speech from different accents/locals.

In some implementations, variational autoencoder (VAE) training trains the VC model 400 on a reconstruction task using variational autoencoder (VAE) so the source and target speech features 402, 480 are the same. Here, a reconstruction loss module 470 generates a reconstruction loss ($L_{recon}$) 475 between the source speech features 402, serving as ground truth, and target speech features 480, corresponding to reconstructed speech, for use in optimizing the VC model 400 to minimize both L1 and L2-norm squared distance between the source and target speech features 402, 480. Notably, implementing the trained ASR encoder as the content encoder 410 results in freezing the parameters of the content encoder 410 while training the VQ-VAE layer 420, decoder 450, and speaker classifier 460. That is, by freezing the parameters of the content encoder 410 that was trained on ASR loss may encourage the other components to learn different, better representations for the voice conversion task. Notably, the trained ASR encoder is more robust on noisy conditions.

The VQ-VAE layer 420 may be trained adversarially to guarantee that no speaker information (i.e., style content) is present in latent representations of linguistic content 430 output by the VQ-VAE layer 420. In some examples, adversarial training includes sampling random segments of length k of the encoded sequence (i.e., initial latent representation) 415 input to the VQ-VAE layer 420 and using speaker classifier 460 to perform speaker classification on the randomly sampled segments. The speaker classifier 460 may use a reverse gradient to allow adversarial gradient back propagation to update parameters of the content encoder 410 and the VQ-VAE layer 420 to maximize adversarial loss, $L_{adv}$, 462. The speaker classifier 460 may include a multilayer perception (MLP) classifier trained using cross entropy loss, $L_{CE}$, 464 on speakers.

The trained VC model 400 may be further used for augmentation in a zero-shot, cross-lingual context whereby the voice conversion model 400 is trained on speech and speakers from one language but used to augment speech from another language or generate speech in an unseen language where only spoken data exists. While many applications of the VC model 400 are trained on speech from the same language as was used during inference, this is not a requirement. Notably, the VC model 400 still functions when the input utterance is from another language. This simplifies the application of this technique to new unseen languages and domains. While there may be benefits to training a VC model specific for a model, ASR model training can still benefit from this augmentation technique using a pretrained VC model from a different language.

Implementations are further directed toward optimizing VC training and recognizing when the training is going well. The main objective function for training VC models is reconstruction loss. However, this belies whether the model can control the speaker characteristics of the resulting speech. The model 400 is extended with a speaker recognition accuracy—the accuracy of a speaker encoder based on the content encoder outputs 415 and the perplexity (i.e. exponential entropy) of the outputs—to thereby measure how diverse the encoder outputs 415 are. Ideal VC performance includes 1) low reconstruction loss 475 (the signal is preserved), 2) low speaker classification accuracy (minimal speaker information remains in the encoder outputs) and 3) high VQ perplexity (the codebook is well used—high diversity in encoder outputs). While 1 and 2 are included during training the VC model, the ability to monitor all three separately allows us to identify effective VC models without any inference and human evaluation. Subjective evaluation is only required after a model satisfies these objective criteria.

Figure 5:
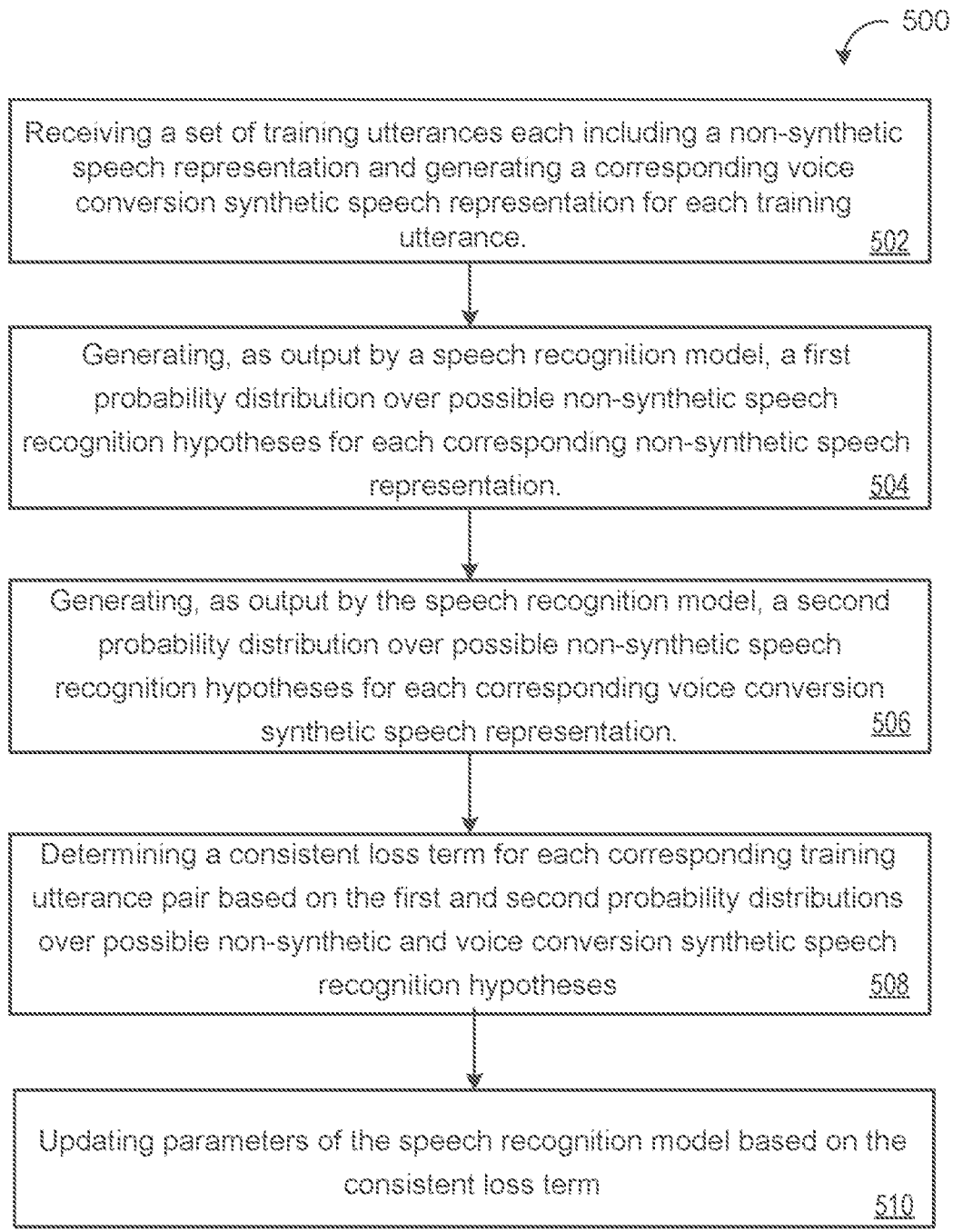
FIG. 5 is a flowchart of an example arrangement of operations for method of training a speech recognition model using voice conversion synthetic speech representations of utterances converted by a voice conversion model from non-synthetic speech representations of the same utterances.

FIG. 5 is a flowchart of an example arrangement of operations for method 500 of training a speech recognition model 200 using voice conversion synthetic speech representations 306 of utterances converted by a voice conversion model 400 from non-synthetic speech representations 304 of the same utterances. The method 500 may execute on the remote computing device 201 of FIG. 1. For instance, the remote computing device 201 includes data processing hardware 610 (FIG. 6) and memory hardware 620 (FIG. 6) in communication with the data processing hardware and storing instructions that when executed on the data processing hardware 610 cause the data processing hardware 610 to perform the operations for the method 500.

At operation 502, the method 500 includes receiving a set of training utterances each including a non-synthetic speech representation 304 of a corresponding utterance, and for each training utterance, generating a corresponding voice conversion (VC) synthetic speech representation 306 by using a VC model 400 to convert the non-synthetic speech representation 304 into the corresponding VC synthetic speech representation 306 of the corresponding utterance. Here, the non-synthetic speech representation 304 and the VC synthetic speech representation form a corresponding training utterance pair 302.

At each of a plurality of output steps for each training utterance pair 302 in the set of training utterance pairs, the method 500 performs operations 504, 506, 508. At operation 504, the method 500 includes generating, for output by the speech recognition model 200, a first probability distribution 311 over possible non-synthetic speech recognition hypotheses (y) for the corresponding non-synthetic speech representation (x) 304 of the corresponding utterance. At operation 506, the method 500 includes generating, for output by the speech recognition model 200, a second probability distribution 312 over possible synthetic speech recognition hypotheses (y) for the corresponding VC synthetic speech representation ($\hat{x}$) 306 of the corresponding utterance. At operation 508, the method 500 includes determining a consistent loss term ($\mathcal{J}_{cons}(\theta)$) 352 for the corresponding training utterance pair 302 (also referred to as "training audio pairs") based on the first probability distribution 311 over possible non-synthetic speech recognition hypotheses (y) and the second probability distribution 312 over possible synthetic speech recognition hypotheses (y).

At operation 510, the method includes updating parameters of the speech recognition model 200 based on the consistent loss term 352 determined at each of the plurality of output steps for each training utterance pair 302 in the set of training utterance pairs. The voice conversion model 400 may include the non-parallel voice conversion model 400 described above with reference to FIG. 4.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
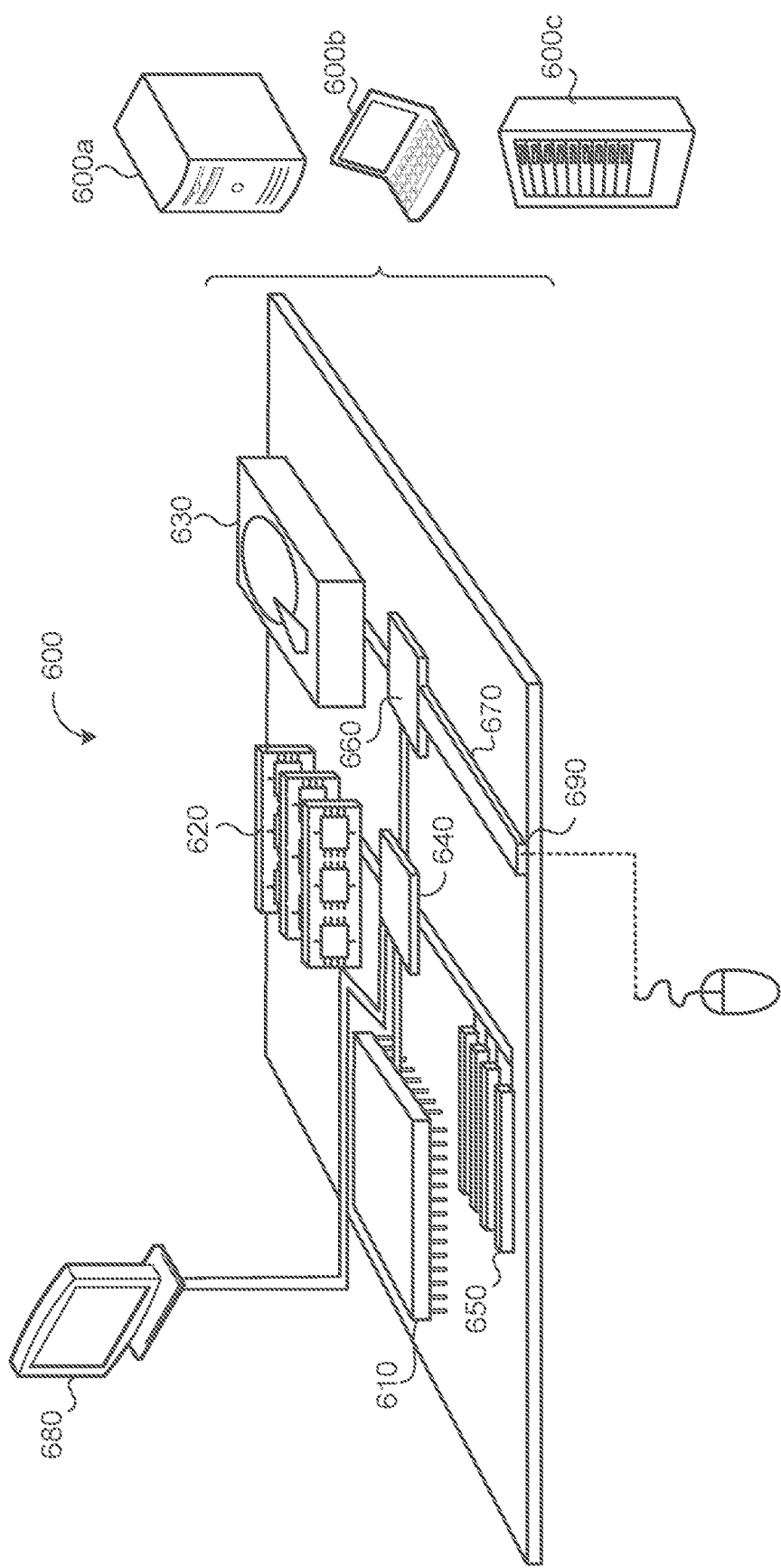
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s) The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well, for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   receiving a set of training utterances each comprising a non-synthetic speech representation of a corresponding utterance;

for each training utterance, generating a corresponding voice conversion synthetic speech representation by using a voice conversion model to convert the non-synthetic speech representation into the corresponding voice conversion synthetic representation of the corresponding utterance, the voice conversion model comprising a content encoder configured to encode each training utterance, the content encoder comprising a pretrained automatic speech recognition (ASR) encoder, wherein the non-synthetic speech representation and the voice conversion synthetic speech representation form a corresponding training utterance pair;

at each of a plurality of output steps for each training utterance pair in the set of training utterance pairs:
generating, for output by a speech recognition model, a first probability distribution over possible non-synthetic speech recognition hypotheses for the corresponding non-synthetic speech representation of the corresponding utterance;
generating, for output by the speech recognition model, a second probability distribution over possible synthetic speech recognition hypotheses for the corresponding synthetic speech representation of the corresponding utterance; and
determining a consistent loss term for the corresponding training utterance pair based on the first probability distribution over possible non-synthetic speech recognition hypotheses and the second probability distribution over possible non-synthetic speech recognition hypotheses; and
updating parameters of the speech recognition model based on the consistent loss term determined at each of the plurality of output steps for each training utterance pair in the set of training utterance pairs,
wherein the voice conversion model comprises:
the content encoder further configured to:
receive, as input, input speech; and
generate, as output, an initial latent representation;
a vector quantization-variational autoencoder (VQ-VAE) layer configured to:
receive, as input, the initial latent representation; and
generate, as output, a latent representation of linguistic content extracted from the input speech that discards speaking style variations in the input speech; and
a decoder conditioned on a speaker embedding and configured to generate output speech based on the latent representation of linguistic content.

2. The method of claim 1, wherein the operations further comprise, at each of the plurality of output steps for each training utterance pair in the set of training utterance pairs:
generating a non-synthetic speech loss term based on the first probability distribution over possible non-synthetic speech recognition hypotheses for the corresponding non-synthetic speech representation of the corresponding utterance and a ground-truth transcription of the corresponding utterance; and
generating a synthetic speech loss term based on the second probability distribution over possible synthetic speech recognition hypotheses for the corresponding synthetic speech representation of the corresponding utterance and the ground-truth transcription of the corresponding utterance.

3. The method of claim 2, wherein the operations further comprise updating parameters of the speech recognition model based on the non-synthetic and synthetic speech loss terms generated at each of the plurality of output steps for each training utterance pair in the set of training utterance pairs.

4. The method of claim 1, wherein:
the non-synthetic speech representation of the corresponding utterance comprises speech spoken by a source speaker and conveys an accent/locale associated with the source speaker; and
the voice conversion synthetic representation of the corresponding utterance comprises synthesized speech representing the corresponding utterance that conveys an accent/local associated with a target speaker.

5. The method of claim 4, wherein the accent/local associated with the source speaker is different than the accent/local associated with the target speaker.

6. The method of claim 4, wherein the voice conversion synthetic speech representation conveys the same linguistic content as the non-synthetic speech representation of the corresponding utterance.

7. The method of claim 1, wherein the voice conversion model comprises a non-parallel voice conversion model.

8. The method of claim 1, wherein the pretrained ASR encoder was previously trained on an ASR loss for a speech recognition task.

9. The method of claim 8, wherein the parameters of the pretrained ASR encoder remain fixed while training the VQ-VAE layer and the decoder of the voice conversion model.

10. The method of claim 1, wherein the VQ-VAE layer is trained using a VQ loss based on the latent representation of linguistic content generated for each timestep, the VQ loss encouraging the VQ-VAE layer to minimize a distance between an output and a nearest codebook.

11. The method of claim 1, wherein the decoder is configured to:
receive, as input, the latent representation of linguistic content for the input speech and the speaker embedding; and
generate, as output, the output speech comprising a reconstruction of the input speech.

12. A system comprising:
data processing hardware; and
memory hardware in communication with the data processing hardware and storing instructions that when executed by the data processing hardware causes the data processing hardware to perform operations comprising:
receiving a set of training utterances each comprising a non-synthetic speech representation of a corresponding utterance;
for each training utterance, generating a corresponding voice conversion synthetic speech representation by using a voice conversion model to convert the non-synthetic speech representation into the corresponding voice conversion synthetic representation of the corresponding utterance, the voice conversion model comprising a content encoder configured to encode each training utterance, the content encoder comprising a pretrained automatic speech recognition (ASR) encoder, wherein the non-synthetic speech representation and the voice conversion synthetic speech representation form a corresponding training utterance pair;
at each of a plurality of output steps for each training utterance pair in the set of training utterance pairs:
generating, for output by a speech recognition model, a first probability distribution over possible non-synthetic speech recognition hypotheses for the corresponding non-synthetic speech representation of the corresponding utterance;

generating, for output by the speech recognition model, a second probability distribution over possible synthetic speech recognition hypotheses for the corresponding synthetic speech representation of the corresponding utterance; and determining a consistent loss term for the corresponding training utterance pair based on the first probability distribution over possible non-synthetic speech recognition hypotheses and the second probability distribution over possible non-synthetic speech recognition hypotheses; and updating parameters of the speech recognition model based on the consistent loss term determined at each of the plurality of output steps for each training utterance pair in the set of training utterance pairs, wherein the voice conversion model comprises:

the content encoder further configured to:
receive, as input, input speech; and
generate, as output, an initial latent representation;

a vector quantization-variational autoencoder (VQ-VAE) layer configured to:
receive, as input, the initial latent representation; and
generate, as output, a latent representation of linguistic content extracted from the input speech that discards speaking style variations in the input speech; and a decoder conditioned on a speaker embedding and configured to generate output speech based on the latent representation of linguistic content.

13. The system of claim 12, wherein the operations further comprise, at each of the plurality of output steps for each training utterance pair in the set of training utterance pairs:

generating a non-synthetic speech loss term based on the first probability distribution over possible non-synthetic speech recognition hypotheses for the corresponding non-synthetic speech representation of the corresponding utterance and a ground-truth transcription of the corresponding utterance; and generating a synthetic speech loss term based on the second probability distribution over possible synthetic speech recognition hypotheses for the corresponding synthetic speech representation of the corresponding utterance and the ground-truth transcription of the corresponding utterance.

14. The system of claim 13, wherein the operations further comprise updating parameters of the speech recognition model based on the non-synthetic and synthetic speech loss terms generated at each of the plurality of output steps for each training utterance pair in the set of training utterance pairs.

15. The system of claim 12, wherein:
the non-synthetic speech representation of the corresponding utterance comprises speech spoken by a source speaker and conveys an accent/locale associated with the source speaker; and
the voice conversion synthetic representation of the corresponding utterance comprises synthesized speech representing the corresponding utterance that conveys an accent/local associated with a target speaker.

16. The system of claim 15, wherein the accent/local associated with the source speaker is different than the accent/local associated with the target speaker.

17. The system of claim 15, wherein the voice conversion synthetic speech representation conveys the same linguistic content as the non-synthetic speech representation of the corresponding utterance.

18. The system of claim 12, wherein the voice conversion model comprises a non-parallel voice conversion model.

19. The system of claim 12, wherein the ASR encoder was previously trained on ASR loss for a speech recognition task.

20. The system of claim 19, wherein the parameters of the pretrained ASR encoder remain fixed while training the VQ-VAE layer and the decoder of the voice conversion model.

21. The system of claim 12, wherein the VQ-VAE layer is trained using a VQ loss based on the latent representation of linguistic content generated for each timestep, the VQ loss encouraging the VQ-VAE layer to minimize a distance between an output and a nearest codebook.

22. The system of claim 12, wherein the decoder is configured to:
receive, as input, the latent representation of linguistic content for the input speech and the speaker embedding; and
generate, as output, the output speech comprising a reconstruction of the input speech.

* * * * *